March 23, 1965 W. A. MULHERN ET AL 3,174,803
WHEEL COVER
Filed April 8, 1963 4 Sheets-Sheet 1

INVENTORS.
William A. Mulhern.
Edward G. Spisak.
BY
Harness, Dickey & Pierce
ATTORNEYS

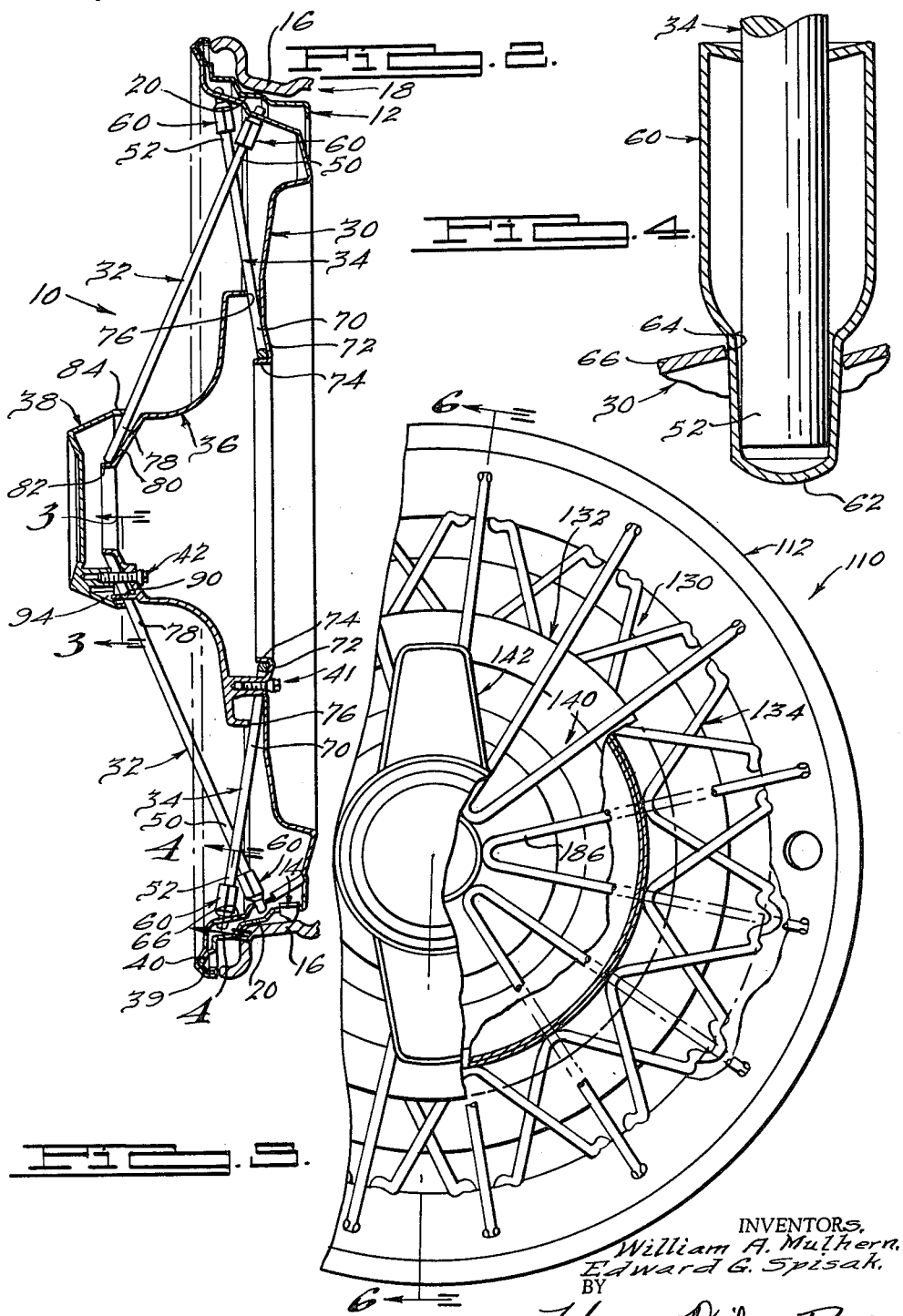

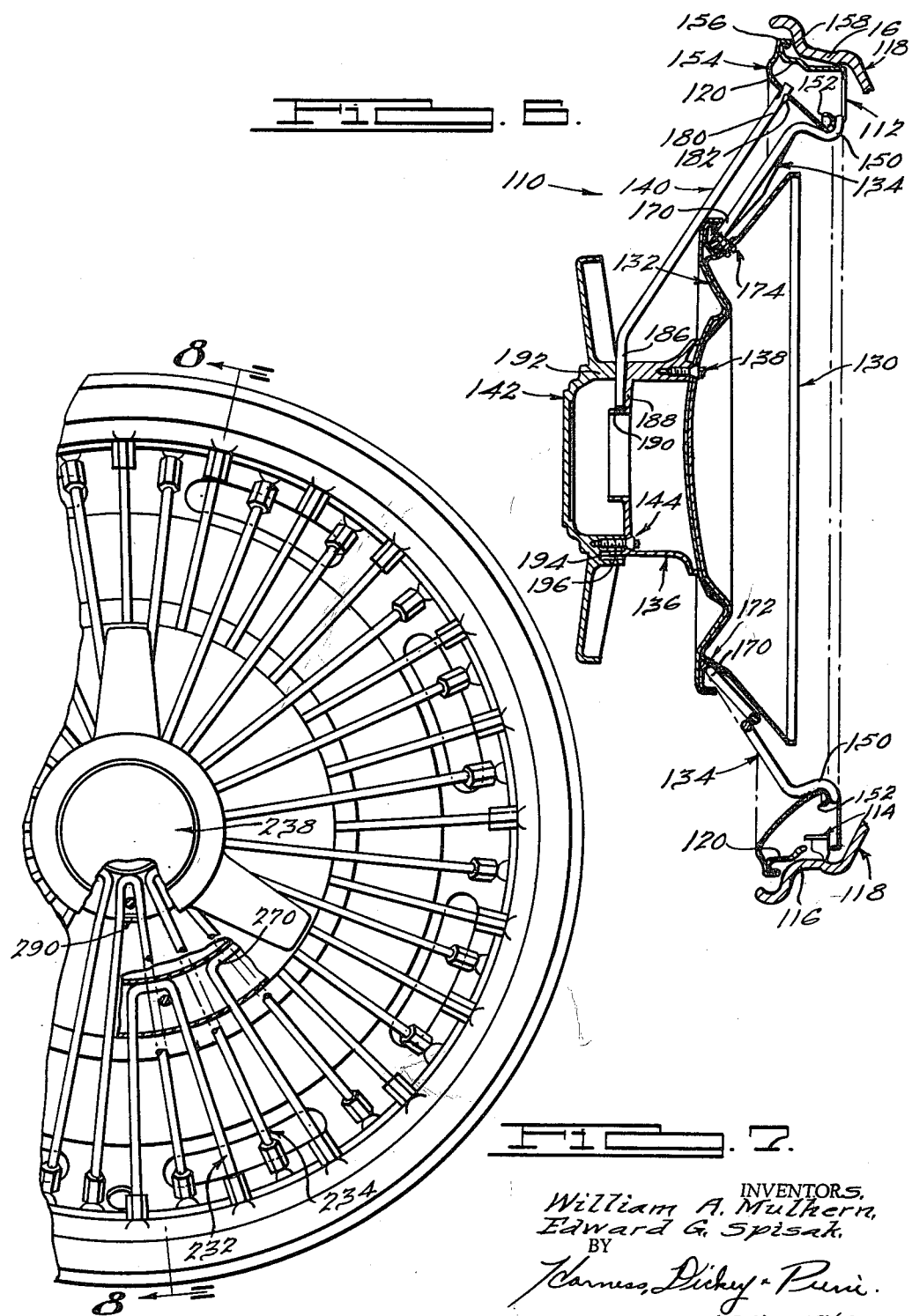

March 23, 1965  W. A. MULHERN ET AL  3,174,803
WHEEL COVER
Filed April 8, 1963  4 Sheets-Sheet 4
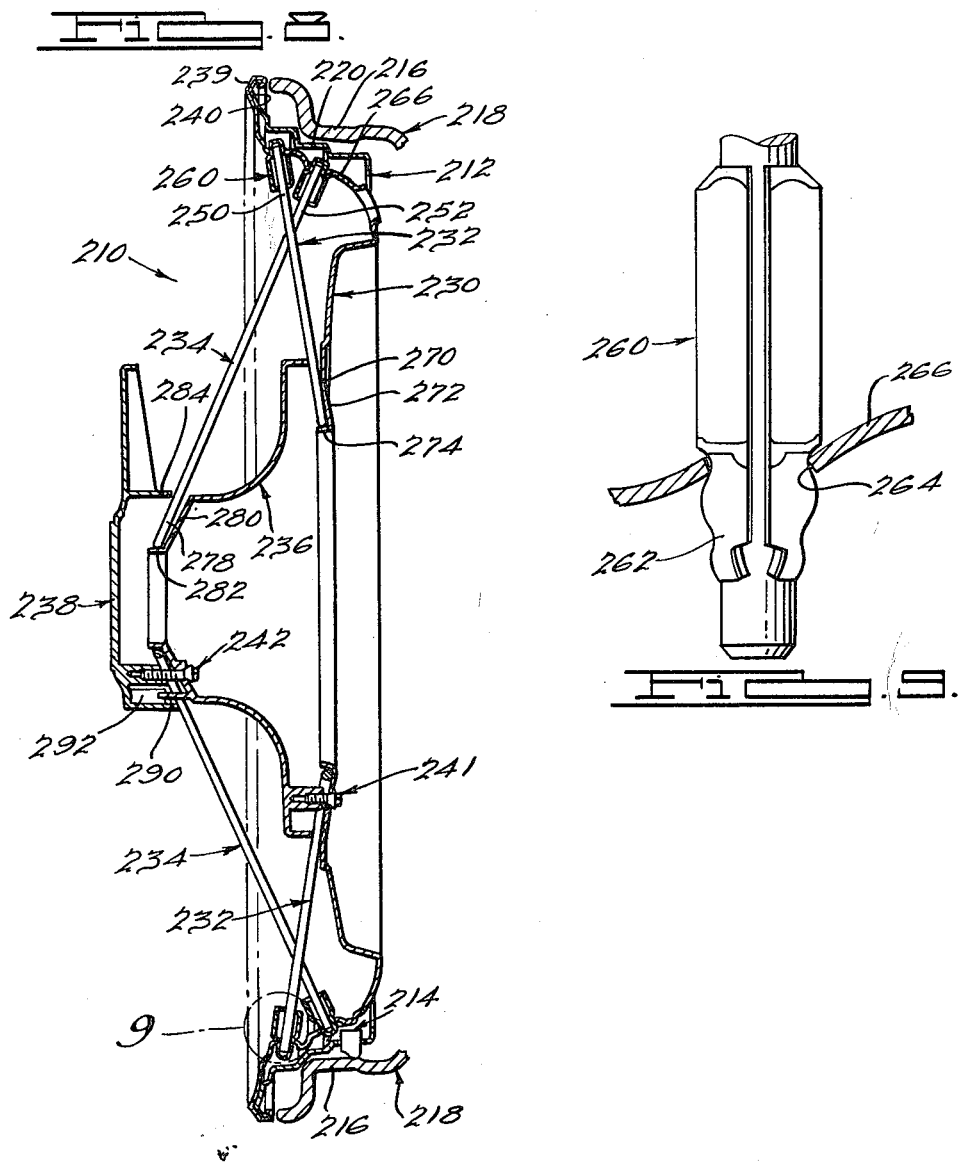
INVENTORS.
William A. Mulhern,
Edward G. Spisak.
BY
Harness, Dickey & Pierce.
ATTORNEYS.

United States Patent Office 3,174,803
Patented Mar. 23, 1965

3,174,803
WHEEL COVER
William A. Mulhern, Detroit, and Edward G. Spisak, Wayne, Mich., assignors to Gar Wood Industries, Inc., Wayne, Mich., a corporation of Michigan
Filed Apr. 8, 1963, Ser. No. 271,381
6 Claims. (Cl. 301—37)

This invention relates generally to wheel covers, and more particularlly to an improved simulated wire wheel cover.

The rapidly increasing popularity of sport and simulated sport vehicles has created a strong demand for simulated wire wheel covers. Such wheel covers offer the aesthetic appeal of wire wheels commonly used on authentic sport vehicles without the expense or disadvantages thereof. For example, wire wheels are susceptible to misalignment and unbalance due to impact with road obstacles whereas conventional stamped steel wheels are relatively impervious to such damage.

However, the use of simulated wire wheel covers heretofore known has been restricted in that the wire spokes of such known covers often rattle and vibrate.

Accordingly, one object of the instant invention is an improved means for fastening the terminal end portions of the wire spokes of a simulated wire wheel cover so as to preclude rattle and vibration thereof.

Authentic wire wheels characteristically have knock-off hubs which are disposed centrally of the wire wheel and axially outwardly therefrom. However, the provision of a simulated knock-off hub on a wire wheel cover raises a problem in that such hubs are relatively heavy and create large dynamic inertia forces which tend to induce rattle of the knock-off hub relative to the body portion of the wheel cover and to effect disengagement of the wheel cover from the vehicle wheel.

Accordingly, another object of the instant invention is an improved means for minimizing the effect of inertia forces on a simulated knock-off hub on a wire wheel cover.

The spokes of a wire wheel are generally secured to the wheel rim by a threaded connection comprising a threaded portion on the wire spoke with lock nuts on opposite sides of the wheel rim. However, the use of such a threaded connection between the wire spokes and the rim of a simulated wire wheel cover would be relatively expensive. On the other hand, the failure to use or simulate the conventional spoke attachment means of a wire wheel destroys the overall impression of authenticity of the wire wheel cover.

Accordingly, yet another object of the instant invention is an improved simulated nut for use at the point of attachment of the wire spokes to the rim of a wire wheel cover which lends authenticity to the wheel cover.

Other objects and advantages of the instant invention will be apparent in the following specification, claims and drawings wherein:

FIGURE 2 is a cross-sectional view taken substantially along the line 2—2 of FIGURE 1;

FIGURE 4 is a cross-sectional view taken substantially along the line 4—4 of FIGURE 2;

FIGURE 5 is a side elevational view, partially broken away, of a modified simulated wire wheel cover;

FIGURE 6 is a cross-sectional view taken substantially along the line 6—6 of FIGURE 5;

FIGURE 7 is a side elevational view, partially broken away, of yet another embodiment of the instant invention;

FIGURE 8 is a cross-sectional view taken substantially along the line 8—8 of FIGURE 7; and, FIGURE 9 is a fragmentary view taken within the circle 9 of FIGURE 8.

Figures 1, 3:
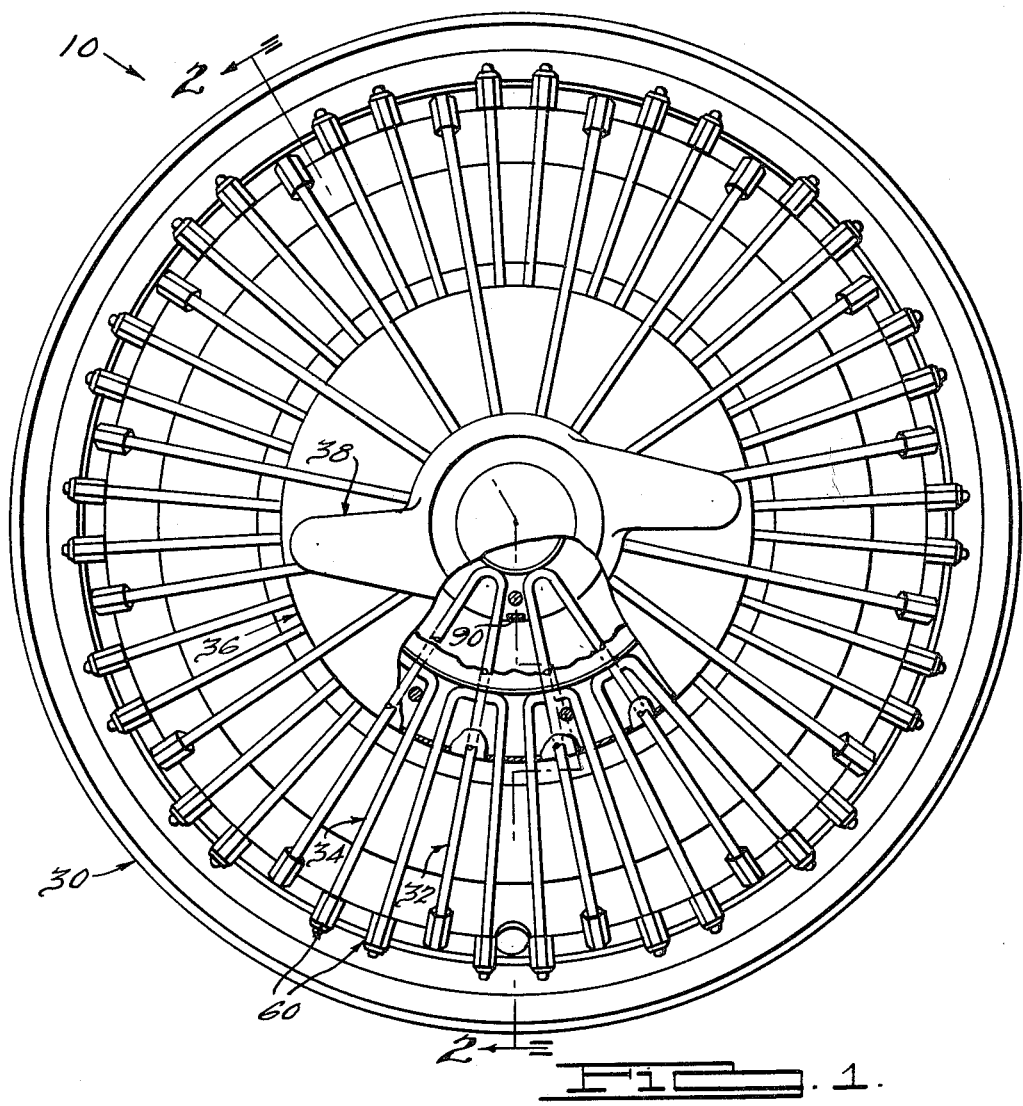
FIGURE 1 is a side elevational view, partially broken away, of a simulated wire wheel cover in accordance with an exemplary embodiment of the instant invention.
FIGURE 3 is a cross-sectional view taken substantially along the line 3—3 of FIGURE 2.

The foregoing problems incident to the provision of a totally satisfactory wire wheel cover are solved by the simulated wire wheel cover of the instant invention by a number of unique structural arrangements which render the simulated wire wheel cover of the instant invention totally satisfactory from a production, an aesthetic, and a service standpoint.

Rattle of the wire spokes of the wire wheel cover is precluded by subjecting the spokes to a relatively small but definite bending stress through a unique interaction between the spoke retaining members.

The relatively large inertia forces operative between a simulated knock-off hub and the mounting therefor are accepted by a novel interlock between the aforesaid components which minimizes the effect of acceleration and deceleration forces on the attachment screws that extend between the hub and supporting structure.

The relatively large inertia forces that tend to disengage the wire wheel cover from the vehicle wheel are accepted by an annular protrusion or bead that is engageable with an axial flange on the vehicle wheel. In this manner inertia forces are unable to effect canting of the wheel cover relative to the wheel which ultimately results in radial displacement of the wheel cover relative to the vehicle wheel.

As best seen in FIGURES 1, 2 and 3 of the drawings an improved simulated wire wheel cover 10, in accordance with an exemplary constructed embodiment of the instant invention comprises an annular retainer flange 12 for the support of a plurality of resilient retaining teeth 14. The retaining teeth 14 are preferably constructed as shown in Patent Number 3,037,816, issued June 5, 1962, and assigned to the assignee of the instant invention. The teeth 14 are engageable with an axially extending flange 16 of a vehicle wheel 18 in the conventional manner.

In accordance with one feature of the instant invention the retainer flange 12 is provided with annular stabilizing shoulder 20 that is disposed in close proximate relation, for example, .003 inch, to the axially extending flange 16 on the vehicle wheel 18 to preclude canting of the wheel cover 10 relative to the vehicle wheel 18. The bead 20 cooperates with the retaining teeth 14 to positively retain the wheel cover 10 on the wheel 18, in that it precludes the initial radial displacement or canting of the wheel cover 10 relative to the vehicle wheel 18 which has been found to take place prior to spurious disengagement of the wheel cover from the vehicle wheel 18.

The simulated wire wheel cover 10 has a generally annular inner plate 30 for the support of a plurality of outer hairpin spokes 32, inner hairpin spokes 34, a spoke retainer 36, and a simulated knock-off hub 38. The plate 30 is secured to the retainer flange 12 as by crimping a peripheral portion 39 over a radially outer edge portion 40 of the retainer flange 12.

The spoke retainer 36 is secured to the plate 30 as by a plurality of machine screws 41 and the knock-off hub 38 is secured to the spoke retainer 36 as by a plurality of machine screws 42.

In accordance with another feature of the instant invention the radially outer ends 50 and 52 of the outer and inner spokes 32 and 34, respectively, are accepted in a plurality of complementary simulated nuts 60. As best seen in FIGURE 4 of the drawings each nut 60 has a truncated conical lower end portion 62 that receives the end portion 52 of its associated inner spoke 34 in wedging relationship. The lower end portion 62 of the simulated nut 60 is received in a complementary initially circular aperture 64 in a spoke retainer flange portion 66 of the plate 30 of the wheel cover 10. The dual wedging actions of the spoke 34 in the nut 60 and of the nut 60 in the plate 30 positively precludes rattle of the assembled wheel cover 10.

It is also to be noted that, because the aperture 64 in the plate 30 of the simulated wire wheel 10 is initially of true circular cross-section, canting of the spoke 34 and nut 60 relative to the generally axially extending spoke retainer flange 66 of the plate 30 twists the periphery of the aperture 64 into a slightly elliptical configuration thereby effecting a biting or wedging action between the nut 60 and the flange 66 of the plate 30.

In accordance with another feature of the instant invention, the radially inner reentrantly bent portions 70 of the inner spokes 34 are seated against a radial flange portion 72 on the plate 30 and an axial flange 74 which, in combination with a plurality of notches 76 in the spoke retainer 36, positively engages the spokes 34. It is to be noted that the spoke retainer 36 engages the spokes 34 at points intermediate the end portions 52 and 70 thereof which are supported and engage the flanges 66 and 72 on the retainer plate 30. Thus, when the spoke retainer 36 is drawn towards the plate 30 by the screws 41 the spokes 34 are slightly bent so as to preload the spokes 34 and preclude rattle thereof when the wheel cover 10 is on the vehicle wheel 18.

The radially outer end portions 50 of the outer spokes 32 are mounted in simulated nuts 60 in the manner discussed hereinbefore. The radially inner end portions 78 of the spokes 32, are positioned and supported by a radial flange 80 and an axial flange 82 on the spoke retainer 36. The simulated knock-off hub 38 has an axial flange 84 that is engageable with the spokes 32 at a point intermediate the radially inner and outer end portions 78 and 50, respectively of the spoke 32 so that, upon tightening of the screws 42 the knock-off hub 38 effects bending of the spokes 32 to pre-stress the spokes 32 and preclude rattle thereof.

In accordance with another feature of the instant invention, as best seen in FIGURE 3 of the drawings, the spoke retainer 36 is provided with an axially extending tongue 90 that is accepted between a pair of circumferentially spaced lugs 92 and 94 on the simulated knock-off hub 38. The tongue 90 accepts dynamic inertia forces between the knock-off hub 38 and spoke retainer 36 so as to minimize the effect of such forces on the retainer screws 42. Provision of the tongue 90 and lugs 92 and 94 has been found to contribute materially to serviceability of the simulated wire wheel cover in field use.

As best seen in FIGURES 5 and 6 of the drawings, a simulated wire wheel cover 110, in accordance with a modified embodiment of the instant invention comprises an annular retainer flange 112 for the support of a plurality of resilient retaining teeth 114. The retaining teeth 114 are preferably constructed as shown in Patent Number 3,037,816, issued June 5, 1962, and assigned to the assignee of the instant invention. The teeth 114 are engageable with an axially extending flange 116 of a vehicle wheel 118 in the conventional manner.

The retainer flange 112, like the retainer flange 12 discussed hereinbefore, is provided with annular stabilizing shoulder or bead 120 that is disposed in close proximate relation, for example, .003 inch, to the axially extending flange 116 on the vehicle wheel 118 to preclude excessive radial movement of the wheel cover 110 relative to the vehicle wheel 118. The bead 120 cooperates with the retaining teeth 114 to positively retain the wheel cover 110 on the wheel 118, in that it precludes the initial radial displacement or canting of the wheel cover 110 relative to the vehicle wheel 118 which has been found to take place prior to spurious disengagement of the wheel cover from the vehicle wheel 118.

The simulated wire wheel cover 110 has a dished inner plate 130 for the support of an inner spoke retainer 132. The inner spoke retainer 132 overlies the plate 130 in generally vested relationship for the support of a plurality of inner spokes 134. An outer spoke retainer 136 is secured to the inner spoke retainer 132 and plate 130 as by a plurality of screws 138. A plurality of outer spokes 140 are retained by an interaction between the outer spoke retainer 136 and a simulated knock-off hub 142 that is secured to the outer spoke retainer 136 as by a plurality of screws 144.

The radially outer ends 150 of the inner spokes 134 are folded about a radially inner edge 152 of a spoke retainer flange 154. The spoke retainer flange 154 is secured to the retainer flange 112 as by crimping an outer peripheral edge 156 thereof about an outer peripheral edge 158 of the retainer flange 112.

The radially inner end portions 170 of the inner spokes 134 are seated in an annular channel 172 that lies between the inner spoke retainer 132 and the plate 130. The channel 172 is crimped to the inner spoke retainer 132 and held against the plate 130 by suitable metal screws 174. It is to be noted that the sopke retainer 132 engages the spokes 134 at points intermediate the end portions 150 and 170 thereof. Thus, when the spoke retainer 132 is drawn towards the plate 130 by the screws 138 and 174, the spokes 134 are slightly bent so as to preload the spokes 134 and preclude rattle thereof when the wheel cover 110 is on the vehicle wheel 118.

Radially outer end portions 180 of the outer spokes 140 extend through complementary apertures 182 in the ring 154. The radially inner end portions 186 of the spokes 140 are positioned and supported by a radial flange 188 and an axial flange 190 on the outer spoke retainer 136. The simulated knock-off hub 142 has an axial flange 192 that is engageable with the spokes 140 at a point intermediate the radially inner and outer end portions 186 and 180, respectively, of the spoke 140 so that, upon tightening of the screws 144 the knock-off hub 142 effects bending of the spokes 140 to prestress the spokes 140 and preclude rattle thereof.

The outer spoke retainer 136 is provided with an axially extending tongue 194 that is accepted in a complementary recess 196 in the simulated knock-off hub 147. The tongue 194 accepts dynamic inertia forces between the knock-off hub 142 and spoke retainer 136 so as to minimize the effect of such forces on the retainer screws 144.

As best seen in FIGURES 7 and 8 of the drawings, yet another modified embodiment 210 of the instant invention comprises an annular retainer flange 212 for the support of a plurality of resilient retaining teeth 214. The retaining teeth 214 are preferably constructed as shown in Patent Number 3,037,816, issued June 5, 1962, and assigned to the assignee of the instant invention. The teeth 214 are engageable with an axially extending flange 216 of a vehicle wheel 218 in the conventional manner.

In accordance with the instant invention the retainer flange 212 is provided with annular stabilizing shoulder or bead 220 that is disposed in close proximate relation, for example, .003 inch to the axially extending flange 216 on the vehicle wheel 218 to preclude canting of the wheel cover 210 relative to the vehicle wheel 218. The bead 220 cooperates with the retaining teeth 214 to positively retain the wheel cover 210 on the wheel 218, in that it precludes the initial radial displacement or canting of the wheel cover 210 relative to the vehicle wheel 218.

The simulated wire wheel cover 210 has a generally annular inner plate 230 for the support of a plurality of relatively short hairpin spokes 232, relatively long hairpin spokes 234, a spoke retainer 236, and a simulated knock-off hub 238. The plate 230 is secured to the retainer flange 212 as by crimping a peripheral portion 239 of the plate 230 over a radially outer edge portion 240 of the retainer flange 212.

The spoke retainer 236 is secured to the plate 230 as by a plurality of machine screws 241 and the knock-off hub 238 is secured to the spoke retainer 236 as by a plurality of machine screws 242.

In accordance with the instant invention the radially outer ends 250 and 252 of the short and long spokes 232 and 234, respectively, are accepted in a plurality of complementary simulated nuts 260. As best seen in FIGURE 9 of the drawings, each nut 260 is split so to receive the end portion of its associated spoke in resilient biting relationship. A lower end portion 262 of the simulated nut 260 is received in a complementary initially circular aperture 264 in a spoke retainer flange portion 266 of the plate 230 of the wheel cover 210.

It is to be noted that, because the aperture 264 in the plate 230 of the simulated wire wheel 210 is initially of true circular cross-section, canting of the associated spoke and nut 260 relative to the generally axially extending spoke retainer flange 266 of the plate 230 twists the periphery of the aperture 264 into a slightly elliptical configuration thereby effecting a biting or wedging action between the nut 260 and the spoke retainer flange 266 of the plate 230.

As best seen in FIGURE 8 of the drawings, the radially inner reentrantly bent portions 270 of the short spokes 232 are seated against a radial flange portion 272 on the plate 230 and an axial flange 274 which, in combination with the spoke retainer 236, positively position the spokes 232. It is to be noted that the spoke retainer 236 engages the spokes 232 at points intermediate the end portions 270 and 250 thereof. Thus, when the spoke retainer 236 is drawn towards the plate 230 by the screws 241 the spokes 232 are slightly bent so as to preload the spokes 232 and preclude rattle thereof when the wheel cover 210 is on the vehicle wheel 218.

The radially outer end portions 50 of the spokes 232 are mounted in simulated nuts 60 in the manner discussed hereinbefore.

The radially inner end portions 278 of the spokes 234 are positioned and supported by a radial flange 280 and an axial flange 282 on the spoke retainer 236. The simulated knock-off hub 238 has an axial flange 284 that is engageable with the spokes 234 at a point intermediate the radially inner and outer end portions 270 and 252, respectively of the spoke 234 so that, upon tightening of the screws 242 the knock-off hub 238 effects bending of the spokes 234 to pre-stress the spokes 234 and preclude rattle thereof.

The spoke retainer 236 is provided with an axially extending tongue 290 that is accepted between a pair of circumferentially spaced lugs 292, one of which is shown, on the simulated knock-off hub 238. The tongue 290 accepts dynamic inertia forces between the knock-off hub 238 and spoke retainer 236 so as to minimize the effect of such forces on the retainer screws 242.

From the foregoing description it should be apparent that the simulated wire wheel cover of the instant invention solves each of the aforementioned problems. The spokes of the wire wheel cover are subjected to a bending stress thereby precluding rattle of the wheel cover on the vehicle wheel. An interlock between a simulated knock-off hub and the spoke supporting members of the wheel cover absorbs inertia forces operating between the knock-off hub and such members to relieve the retaining screws of excessive loads. Novel simulated nuts are provided for the radially outer terminal end portion of the spokes which are bitingly engaged in the peripheral rim structure of the wheel cover.

An important contribution to the wheel cover art is the provision of an annular bead or shoulder in close proximate relation to the axially extending flange of a vehicle wheel that is engageable therewith to preclude excessive canting of the wheel cover relative to the vehicle wheel. It has been found that such canting takes place prior to spurious disengagement of the wheel cover relative to the vehicle wheel. By preventing such initial canting of the wheel cover spurious disengagement is precluded.

It is to be understood that the specific construction of the improved wheel cover herein disclosed and described is presented for the purpose of explanation and illustration and is not intended to indicate limits of the invention, the scope of which is defined by the following claims.

What is claimed is:

1. A wheel structure comprising:
a vehicle wheel having a radially extending outer face and an axially extending wheel flange with a substantially smooth annular inner surface of a first diameter relative to the central axis of said wheel, and
a wheel cover for attachment to the outer face of the vehicle wheel,
said wheel cover comprising,
an annular axially extending retainer flange having a tooth supporting portion disposed at a diameter relatively less than the diameter of said wheel flange,
a plurality of resilient retaining teeth supported by the tooth supporting portion of said retainer flange, said teeth being disposed between the tooth supporting portion of said retainer flange and the wheel flange for bitingly engaging the vehicle wheel, the tooth supporting portion of said retainer flange being maintained at all times in spaced relation to the wheel flange of said wheel by said retaining teeth,
decorative means disposed radially inwardly relative to said retainer flange and supported thereby, and
a stabilizing shoulder extending radially outwardly from said retainer flange and spaced axially outwardly from the retaining teeth on said retainer flange, said shoulder being normally disposed on said cover at a diameter relatively smaller than the diameter of said wheel flange but relatively larger than the diameter of the tooth supporting portion of said retainer flange so as to initially lie in closely spaced relation to the axially extending wheel flange of said vehicle wheel thereby to facilitate assembly of said wheel cover with said wheel, the shoulder on said retainer flange being movable radially outwardly relative to the central axis of said vehicle wheel and engageable therewith upon slight radial movement of the retainer flange on said wheel cover relative to said vehicle wheel for precluding excessive radial movement of the wheel cover relative to the vehicle wheel.

2. A wheel structure comprising a vehicle wheel having an outer face, and
a simulated wire wheel cover for attachment to the outer face of the vehicle wheel, said wire wheel cover comprising an annular retainer flange having means for engaging the vehicle wheel, said retainer flange having a spoke retainer flange portion with a plurality of circumferentially spaced circular apertures therein,
a spoke retainer disposed radially inwardly of said retainer flange,
a plurality of simulated nuts seated in the apertures in the spoke retainer portion of said retainer flange, and
a plurality of radially extending spokes having radially inner portions engaged with said spoke retainer, respectively, and radially outer portions extending into said simulated nuts, respectively, the central axis of said spokes being angularly related to the central axis of the circular apertures in said spoke retainer flange portion so as to cant said nuts relative to said spoke retainer flange whereby the peripheries of the apertures bitingly engage said nuts, respectively.

3. A wheel structure comprising a vehicle wheel having an outer face, and
a simulated wire wheel cover for attachment to the outer face of the vehicle wheel comprising,
an annular axially extending retainer flange, means on said flange for engaging the vehicle wheel, said retainer flange having a spoke retainer portion with plurality of circumferentially spaced apertures, a spoke retainer disposed radially inwardly of said retainer flange, a plurality of simulated nuts seated in the apertures in the spoke retainer portion of said retainer flange, and a plurality of radially extending spokes having radially inner portions engaged with said spoke retainer, respectively, and radially outer portions extending into said simulated nuts, respectively, the central axis of said spokes being angularly related to a plane defined by the periphery of the apertures in said retainer flange so as to cant said nuts relative to the spoke retainer portion of said retainer flange and twist the peripheries of the apertures to bitingly engage said nuts, respectively.

4. A wheel structure in accordance with claim 3 wherein the apertures in said retainer flange are generally circular and said nuts have a hexagonal cross section radially inwardly of said retainer flange and a circular cross section radially outwardly thereof.

5. A wheel structure in accordance with claim 3 wherein said nuts have a conical seat for the acceptance of said spokes.

6. A wheel structure in accordance with claim 3 wherein said nuts have a conical section for acceptance in the apertures in said retainer flange.

References Cited by the Examiner

UNITED STATES PATENTS

| | | | |
|---|---|---|---|
| 1,878,528 | 9/32 | Kraeft | 301—60 |
| 2,709,114 | 5/55 | Plotkin | 301—37 |
| 2,710,775 | 6/55 | Buerger | 301—37 |
| 2,712,474 | 7/55 | Gaylord | 301—37 |
| 2,746,805 | 5/56 | Gamundi | 301—37 |
| 3,092,420 | 6/63 | Baldwin | 301—37 |

FOREIGN PATENTS 532,673    8/55    Italy.

ARTHUR L. LA POINT, *Primary Examiner.*